United States Patent [19]

Rhyner

[11] Patent Number: 4,509,047
[45] Date of Patent: Apr. 2, 1985

[54] CIRCUIT FOR CONNECTING A PROCESS COMPUTER BY MEANS OF A NUMBER OF ANALOG CHANNELS WITH A MACHINE TOOL

[75] Inventor: Fritz Rhyner, Zurich, Switzerland

[73] Assignee: Maag Gear-Wheel & Machine Company Limited, Zurich, Switzerland

[21] Appl. No.: 423,192

[22] Filed: Sep. 24, 1982

[30] Foreign Application Priority Data

Oct. 2, 1981 [CH] Switzerland .................. 6339/81

[51] Int. Cl.³ .................. H04Q 9/00; G06F 15/46
[52] U.S. Cl. .................. 340/825.23; 364/180
[58] Field of Search .................. 340/825.23; 364/474, 364/180; 318/567, 604, 652

[56] References Cited

U.S. PATENT DOCUMENTS 3,984,665 10/1976 Shriver et al. .................. 364/180
4,380,796 4/1983 Ostby .................. 340/825.23

Primary Examiner—Donald J. Yusko
Attorney, Agent, or Firm—Werner W. Kleeman

[57] ABSTRACT

The circuit contains two random-access memories or storages into which there is alternately written-in data received from a process computer. The data, in addition to the related addresses, is read-out at two intermediate storages or memories which deliver, by means of a digital-to-analog converter which can be set by a channel selection switch to the correlated analog channel, analog control-and-regulation signals for a machine tool. Two reversing switches which can be alternately opposingly switched enable writing into the one random-access memory, whereas the other random-access memory is read. A further reversing switch switches to the related channel address- and channel data intermediate storage. The circuit has 20 to 64 differential analog output channels with maximum signal voltages of ±10 volts. The resolution of the analog signal amounts to 16-bits, resulting in quasi-continuous analog output voltage signals (voltage steps or stages in the signal of minimum 0.3 mV), which can be reliably used in the regulation circuits of a machine tool.

7 Claims, 1 Drawing Figure

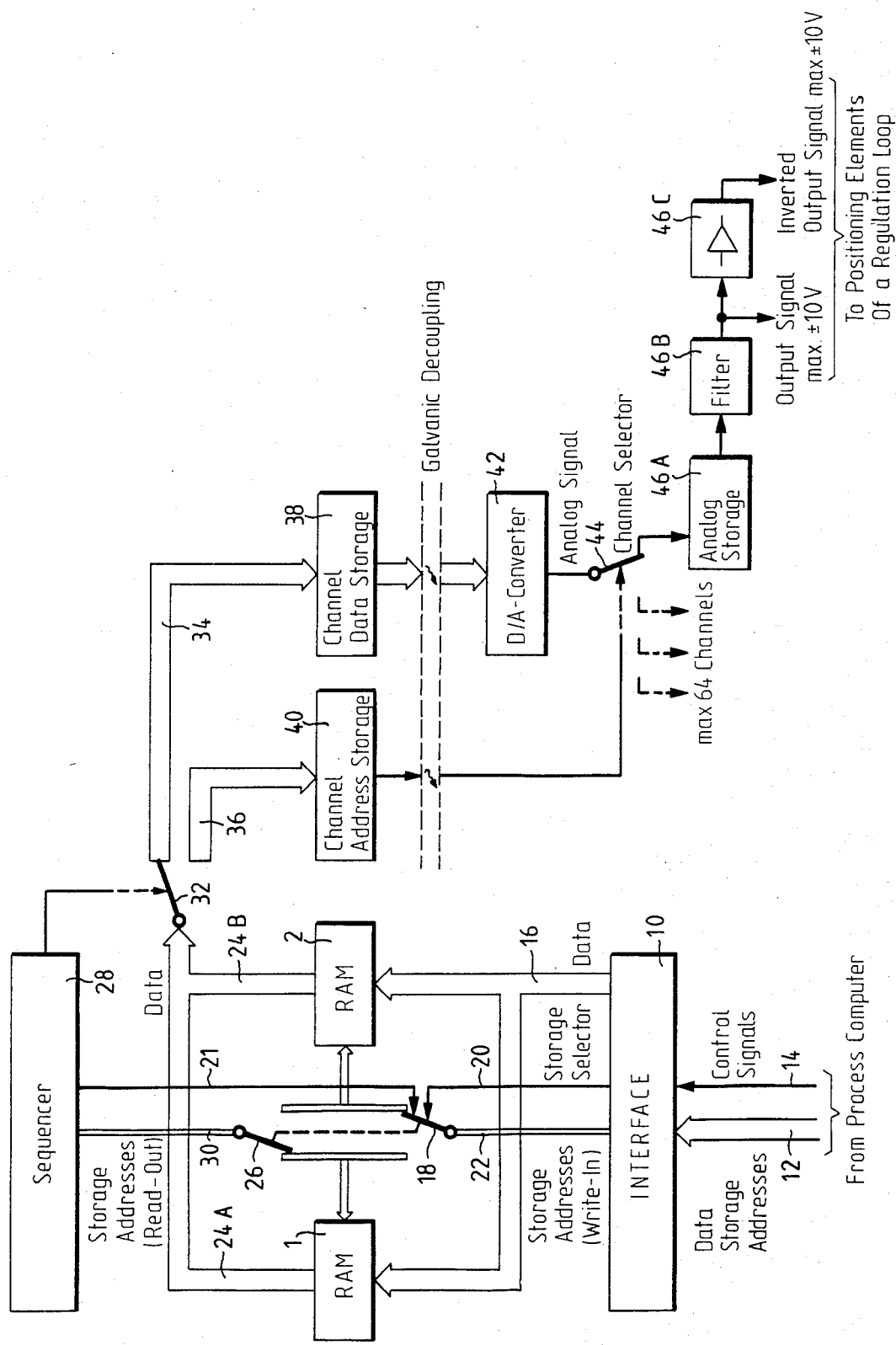

CIRCUIT FOR CONNECTING A PROCESS COMPUTER BY MEANS OF A NUMBER OF ANALOG CHANNELS WITH A MACHINE TOOL

BACKGROUND OF THE INVENTION

The present invention relates to a new and improved construction of circuit for connecting a process computer by means of a number of analog channels with a machine tool.

Generally speaking, the circuit arrangement of the present development is of the type containing an interface at its input side, a digital-to-analog converter (D/A-converter) for converting digital data received from the process computer into analog signals which are to be delivered to analog channels. Additionally, there is provided a sequencer for multiplex control of the signal output to the analog channels, and there are also provided analog storages which are connected forwardly of the analog channels.

With a heretofore known circuit of this type, as disclosed for instance in the brochure "iSBX 328" of the Intel Corporation, dated September 1980, there are provided eight analog output channels at which there can be outputted an output voltage or potential of maximum ±5 volts (asymmetrical), and the resolution amounts to 12-bits. If for this resolution of 12-bits there is formed from the digital data furnished by the process computer a variable output voltage of ±5 volts, then this means that in the step curve of the analog voltage signal each step or stage represents a voltage surge of minimum 2.4 mV, because the bit with the lowest significance or place furnishes a voltage of 2.4 mV. Such voltage steps or stages in the analog output voltage signal are too large for regulation circuits provided for a machine tool, because they can excite the regulation circuits into oscillation. Such undesired excitations can only be avoided with a quasi-continuous signal, not however with a signal which possesses voltage steps of minimum 2.4 mV. The known circuitry is therefore also predominantly used for supplying analog voltages for measuring instruments, cathode ray tube controls, programmable current supply systems, and positioning or adjustment elements conventionally used in industrial applications.

For these fields of use there is adequate the resolution of 12-bits and the signal quality attainable with an asymmetrical output voltage of maximum ±5 volts (i.e. −5 to +5 or 0 to +5 volts). Since with the known circuit it is only possible to work with two bytes, i.e. 16-bits, because of the Intel interface component 8041A provided at the input side, and as to such 16-bits 12-bits thereof are intended for the data and the remaining 4-bits for the channel control and the like, the resolution also cannot be increased to a higher bit number with the same number of channels. Additionally, the asymmetrical output voltage of maximum ±5 volts, generated by the known circuitry, is too small for the functional reliability required for regulation circuits of machine tools, because machine tools usually work in rooms or areas containing pronounced spurious or disturbing effects and there can be interposed between the input interface of the circuit and the receivers, for instance positioning or adjustment elements, conductors or lines having lengths of 5 to 10 meters. The greater the voltage of the control signals that much smaller is, however, the influence of the spurious signals. A simple increase of the delivered voltage, for instance by providing an amplifier having a gain of 2, would increase the functional reliability and also would increase the aforementioned voltage steps in the analog output signal from a minimum of 2.4 mV to a minimum of 4.8 mV, however such would be even more unfavourable for regulation circuits, since there would then be present a greater danger of the excitation of oscillations. Also, the low number of eight output channels, with the heretofore known circuitry, could not be increased because the analog storage (sample and hold storage or sample storage) provided at the output of the analog output multiplexer contained in the circuit, would require a continuous refreshing of its storage content. With the known circuit there is refreshed a single channel with a frequency of 5 kHz, whereas all eight channels are refreshed with 1 kHz. If the number of channels were increased, then the refreshing frequency would be too low and there would exist the danger that the sample storage no longer could be periodically refreshed at the proper point in time. Furthermore, with the heretofore known construction of circuit what is disadvantageous is that there is not contained therein any galvanic decoupling. If, specifically, the known circuitry were connected with a machine tool, where for safety reasons there is always provided earthing, then the circuit, as concerns its potential, could not be operated independent of the machine tool, so that the functional reliability would be reduced. The total operating course or cycle, namely selection of each active channel, selection of the operating mode, data transmission and so forth, is only controlled by software with the known circuit, and which is contained in the input interface 8041A.

SUMMARY OF THE INVENTION

Therefore, with the foregoing in mind it is a primary object of the present invention to provide a new and improved construction of circuit for connecting a process computer by means of a number of analog channels with a machine tool, in a manner not afflicted with the aforementioned drawbacks and limitations.

Another and more specific object of the present invention is to provide an improved construction of circuit for connecting a process computer by means of a number of analog channels with a machine tool in a manner such that there is realized an appreciably simpler construction, there is delivered an appreciably greater output voltage, there are present an appreciably greater number of output channels, and there is realised a greater resolution of at least 16-bits.

Still a further significant object of the present invention is directed to a new and improved construction of circuit for interconnecting a process computer with a machine tool by means of a number of analog channels, which circuit is relatively simple in construction and design, extremely reliable in operation, economical to fabricate, and not readily subject to breakdown or malfunction.

Now in order to implement these and still further objects of the invention, which will become more readily apparent as the description proceeds, the circuit of the present development is manifested by the features that there are provided two random-access memories (RAM's) which are connected in circuit after the interface. Two reversing switches are connected with the interface and sequencer, respectively, and can be oppositely adjusted or set with respect to one another, these reversing switches serving for connecting the one random-access memory or storage with the interface by means of a storage address line for writing-in 8-bit data by means of a data bus into said one random-access memory and the other random-access memory, by means of a further storage address line, with the sequencer for reading-out data from such other random-access memory by means of a further data bus and vice versa. Additionally, there is provided a third reversing switch which is adjustable or settable by means of the sequencer and serves to alternately connect the further data bus with a channel data storage or memory connected with the D/A-converter and a channel address storage or memory. A channel selector switch which is connected with the D/A-converter and which can be adjusted or set by means of the channel address storage serves to switch the D/A-converter to the individual channels.

The circuit of the invention contains extremely simple hardware, namely essentially consists of four storages or memories and four reversing switches, and gets by with a minimum of software. The resolution of the analog signal, which is delivered by the pre-programmable D/A-converter with a maximum of ±10 volts and pre-programmed at a higher potential than with the known circuit, amounts to 16-bits. Since, in this case, the bit with the lowest significance or place produces a voltage step in the analog output signal of 0.3 mV, the output signal constitutes a quasi-continuous voltage which extensively eliminates the danger that a regulation circuit where there is processed the output signal will be excited into oscillation.

According to a further aspect of the invention a galvanic decoupling for instance by means of opto-couplers, can be provided between the channel data storage and the channel address storage on the one hand and the D/A-converter or the channel selector switch, on the other hand. With this system design there is realised a high security against spurious or faulty operation because the circuit section connected with the analog channels can be operated independently of one another as concerns their potential.

The number of analog channels can amount to at least 20 and at most 64 channels. Such number of analog channels exceeds by far the possible number of analog channels which can be provided with the prior art circuit, so that the numerous regulation tasks which must be performed in a machine tool can be effectively accommodated. The number of output channels can amount to, as stated, a maximum of 64 in consideration of the format of the data, without the refresh frequency for the sample storage being too low.

According to a further feature of the invention, it is possible to arrange after the analog storage of each channel a filter, the output terminal of which forms the channel output. With this arrangement there is extensively suppressed the switching effects of the analog storage.

An inverter can be connected with the output terminal of each channel and which delivers the inverted output signal. Also, the symmetrical output signals can be constituted by potentials of maximum ±10 volts. Here, the output of the circuit is symmetrical and delivers voltages which are considerably greater than with the known circuit, so that there is appreciably enhanced the functional reliability.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates a block circuit diagram of an exemplary embodiment of circuit constructed according to the invention.

DETAILED DESCRIPTION OF THE PREFERRED EMBODIMENTS

Describing now the drawings, the input or output side of the circuit depicted in the single FIGURE is formed by an interface or interface circuit 10 which receives data and related storage addresses from a suitable not particularly illustrated process computer by means of a system bus 12. The interface 10 may be constituted, for instance, by the commercially available integrated circuit type 8255 manufactured by Intel Corporation. This data is serially inputted from the process computer by means of the interface 10 into the circuit and is converted thereby into analog signals and then distributed to the related output channels which, in the here illustrated exemplary embodiment, lead to the positioning or adjustment elements of the regulation loops of a machine tool, for instance a gear grinding machine. In the here described exemplary arrangement the number of such channels can amount to maximum 64 channels, as will be further explained hereinafter during the course of this disclosure.

There can be provided additional interfaces or interface circuits, like the interface 10, which then control the related analog output channels by means of a similar type circuit. For the selection of the relevant interface 10 the process computer delivers control signals by means of a control signal line 14.

The data output of the interface 10 is connected by means of a data bus 16 with a storage or memory 1 and a storage or memory 2, as shown, these storages or memories 1 and 2 comprising random-access memories, such as the commercially available integrated circuit type 93419 of Fairchild Semiconductor Corporation. The data is alternately inputted either to the storage 1 or to the storage 2, and this is governed by a reversing switch 18 incorporated between the storage 1 and the storage 2. The position of the reversing switch or switch means 18 is selected by the interface 10 which sets or positions the reversing switch 18 by means of a line 20 designated as the "storage or memory selector". By means of a storage address line 22 the interface or interface circuit 10 delivers, by means of the reversing switch 18, the storage addresses to the one or other storage or memory 1 and 2, respectively, which belong to the data to be written-in or entered into the one or other of these storages.

These storages or memories 1 and 2 during the reading thereof deliver, and specifically alternately, data in each case by means of a data bus 24A and 24B, respectively, this data having been stored at their storage addresses. This means that during such time as data is being entered or written into the one storage data is retrieved or read-out of the other storage and vice versa. To perfect this alternate control of the storages or memories 1 and 2, there is provided a further reversing switch or switch means 26 which is operatively coupled with the first-mentioned reversing switch 18 such that, whenever the reversing switch 18 is operatively switched to one of the storages, the other reversing switch 26 is operatively switched to the other storage and vice versa. A sequencer or sequencing device 28 for controlling the operational cycle indicates by means of a storage address line 30 and the reversing switch 26 that storage, such as the storage 1 or the storage 2, at whose storage addresses there is to be read-out data, whereas at the other storage data is entered or written-in by means of the interface 10. The sequencer 28 may be the commercially available integrated circuit type 9408 likewise available from Fairchild Semiconductor Corporation. The data buses 24A and 24B lead to a reversing switch or switch means 32 which is periodically switched by the sequencer 28 to a channel data bus 34 and a channel address bus 36. The channel data bus 34 leads to a channel data storage 38, and the channel address bus 36 leads to a channel address storage 40. The channel data storage 38 and the channel address storage 40 each may be constituted, for instance, by the commercially available integrated circuit type AM 2915 available from Advanced Micro Devices. The output of the channel data storage 38 is connected with a digital-to-analog converter 42 (D/A-converter) which delivers at its output the analog signals corresponding to the channel data, by means of a channel selector switch 44, to the relevant analog output channel which has been designated by the relevant channel address in the channel address storage 40. The D/A-converter 42 may be the commercially available integrated circuit type DAC 71 manufactured by Burr-Brown Corporation. In order to set the channel selector switch 44 the output of the channel address storage 40 is operatively connected with the reversing switch contact of the channel selector switch 44.

Each analog output channel, of which there may be present a maximum of 64 such channels, consists of an analog storage 46A, constituted for instance by a sample/hold or sample storage, a filter 46B connected in circuit thereafter, and an inverter 46C connected in circuit after the filter 46B. A suitable analog storage 46A is integrated circuit type IH 5111 available from Intersil Corporation, whereas an example of the filter 46B which is suitable for the purposes of the invention is the integrated circuit type LF 353 available from National Semiconductor Corporation. At the output of the filter 46B there is delivered an analog output signal of maximum +10 volts and at the output of the inverter (or inverting amplifier) there is delivered the inverted output signal of maximum −10 volts. These signals are delivered to positioning or adjustment elements of a regulation loop, for instance in a gear grinding machine.

Between the outputs of the channel address storage 40 and the channel data storage 38 and the channel selector switch 44 or D/A-converter 42 connected therewith there is provided a galvanic decoupling which, for instance, consists of conventional opto-couplers and renders the computation-side section of the circuit independent as to potential from the analog channel-side section of the circuit, and thus ensures that such will operate in a functionally reliable fashion. The analog channel-side section of the circuit is galvanically coupled with the machine which is usually earthed or grounded for reasons of safety. The analog storage 46A principally consists of an amplifier with a subsequently connected capacitor, between which there is arranged a switch. Upon issuance of the command "sample" the switch is closed and the capacitor is charged. Upon issuance of the command "hold" the switch is opened and the capacitor maintains stored the signal previously delivered thereto. In order to a filter-out undesired switching effects from the analog output signal of the analog storage 46A there is provided the filter 46B. Since leakage currents occur in the capacitors of the analog storage 46A it is necessary to periodically refresh the signal content of the analog storage. With the here contemplated field of use of the circuit in conjunction with a regulation loop in a machine tool the analog signal fluctuations, which are predicated upon discharge phenomena because of the leakage currents, must remain smaller than 1 mV. This analog signal accuracy requires, with a predetermined sampling frequency, limiting the circuit design to a maximum of 64 analog output channels. If the number of channels were further increased, then the leakage currents could empty the sample storage in each case between two refreshing operations to such an extent that the signal drift would be greater than 1 mV.

The output of the circuit delivers a symmetrical output voltage of maximum ±10 volts. This results in the following advantages:

If a differential amplifier connected forwardly of the adjustment elements is operatively connected with both of the output signal lines, and the inputs of which differential amplifier are connected with the one or other output signal line, as the case may be, and if there is assumed that at each line there is effective an equivalent spurious voltage, then both of the spurious voltages of the same sign and acting upon the output signal lines eliminate one another during the subtraction operation.

Prior to describing in detail the mode of operation of the circuitry there will be first explained the protocol command organisation for the data transmission in the circuit. Each data block per channel and inputted by the process computer into the circuit consists of four bytes, of which each contains 8-bits, namely one byte which contains the number of the correlated channel and one byte which contains the storage address for the storages 1 or 2, and two bytes which contain the data bits. This command organisation renders possible attaining a resolution of 16-bits, so that there can be realised quasi-continuous output signals of maximum ±10 volts which conceptually can be construed as approximately, for instance, step-shaped sinusoidal curves in which each step corresponds to a voltage surge of only 0.3 mV for the here described exemplary embodiment. The process computer serially delivers to the interface 10 the four bytes of a data block per channel considered for themselves and all of the commands in toto.

As to the following description of the mode of operation of the circuit it is assumed that the process computer has delivered a control signal by means of which there has been selected the interface 10. Then, based upon the software there is accomplished by means of the process computer an interrogation in order to ascertain whether the storage 1 or the storage 2 is free in order to write-in or enter data. It is assumed that the interrogation operation has confirmed that the storage 2 is free for writing-in data. By means of the data bus 16 data is then stored at the corresponding addresses in the storage or memory 2. After the data storage operation has been completed then, while taking into account the cycle sequence, there is again switched by means of the interface 10 and via the storage selector line 20 the reversing switch 18, and specifically to the storage 1. At the same time the reversing switch 26 is switched to the other storage, i.e. to the storage or memory 2. Now it is possible to write-in or enter data into the storage 1 and to read-out or retrieve data from the storage 2. The sequencer 28 periodically switches to the channels by means of the reversing switch 32 and the channel selector switch 44 with the clock or cycle fixed for the circuit by the number of channels and the thereupon dependent refreshing time of the analog storage 46A, so that the channels. When the sequencer 28 has completed a refresh cycle, i.e. all of the channels have been refreshed, and to the extent that such is required by the interface 10 it switches the reversing switches 26 and 18 by means of the line 20 or a line 21, as the case may be so that the data can again be read-out of the one storage and at the same time data can again be written into the other storage. Otherwise, there is initiated a refreshing cycle with the same storage as the data source.

By switching the reversing switch 32 the data which, in the illustrated exemplary embodiment, is delivered by the storage 2 is inputted, in conjunction with the related channel addresses, by means of the channel data bus 34 to the channel data storage 38 or by means of the channel address bus 36 to the channel address storage 40, respectively. Since the data flow consists of series channel data and channel addresses there is accomplished the switching of the reversing switch 32 by the sequencer 28 always in accordance with the arrival of data or addresses at the reversing switch 32. The channel data storage 38 delivers the channel data to the D/A-converter 42 when the channel address storage 40 has set the channel selector switch 44 to the analog output channel correlated to such data. The analog storage 46A then delivers the output signal by means of the filter 46B, which output signal is then still inverted by the inverter 46C for the above-explained reasons.

While the processor causes, by means of the interface 10, data to be entered or written into the storage or memory 2 for certain channels, at the same time there is retrieved or read-out of the storage or memory 1 data which has been stored therein. At the output of the circuit the channel selector switch 44 is alternately switched-over to the desired channels, whereafter the cycle begins anew. Of course, the switching operation can be accomplished from channel number 20 to channel number 37, i.e. it is not necessary to undertake the switching operations between the channels in the sequence of their channel numbers.

The described circuit for the conversion of digital data which has been delivered by the process computer into analog control or regulation signals for the regulation loops of a machine tool has been realised, in a practical field of application, for 20 channels. However, the refreshing frequency of the analog storage enables increasing the number of channels to a maximum 64 channels without the drift (analog signal accuracy) becoming greater than 1 mV, something which for instance is extremely important in the case of gear grinding machines which operate in the $\mu$-range.

As far as the hardware of the circuit is concerned it is of quite simple design, since the computation section of the circuit gets by with the use of four storages and four reversing switches. The cycle or sequence control which is undertaken by the sequencer 28 is extremely simple because only channel data and channel addresses must be sequentially read-out of the random-access memories 1 or 2, as the case may be, and correlated to the corresponding intermediate storages 38 or 40, respectively. This correlation allows for a simple multiplex operation enabling the use of only one expensive D/A-converter. The cyclically operating sequencer 28, after writing-in data into the random-access memory 1 or the random-access memory 2, undertakes the monitoring of the random-access memory for the further data processing. As far as the process computer is concerned it need only determine when it is necessary to read-out the relevant random-access memory. As an example of a suitable process computer which can be used there is mentioned the commercially available type 8086 of Intel Corporation.

By virtue of the differential analog outputs of the circuit, the number of which can amount to at least 20 and at most 64 and which can furnish the maximum signal voltages of $\pm 10$ volts, there is realised the high operational reliability required for machine tools, whereas the high resolution of 16-bits produces the quasi-continuous control or regulation signal needed for machine tools.

While there are shown and described present preferred embodiments of the invention, it is to be distinctly understood that the invention is not limited thereto, but may be otherwise variously embodied and practiced within the scope of the following claims. Accordingly,

What I claim is:

1. A circuit for connecting a process computer by means of a number of analog channels with a machine tool, comprising:
   an interface arranged at an input side of the circuit;
   a D/A-converter for converting digital data received from the process computer into analog signals which are to be delivered to the analog channels;
   a sequencer for multiplex control of a signal output to the analog channels;
   each analog channel containing an analog storage;
   two random-access memories arranged in circuit with and after said interface;
   a storage address line and a data bus cooperating with said interface;
   a further storage address line cooperating with said sequencer;
   a further data bus cooperating with said random-access memories;
   two reversing switches, defining first and second reversing switches, operatively connected with said interface and said sequencer and which can be set in opposition with respect to one another for connecting one of the random-access memories with the interface by means of said storage address line for writing-in 8-bit data by means of said data bus into said one random-access memory and for operatively connecting the other random-access memory by means of said further storage address line with the sequencer for reading-out data by means of said further data bus out of the other random-access memory and vice versa;
   a third reversing switch which can be selectively set by said sequencer;
   a channel data storage connected with the D/A-converter;
   a channel address storage;
   said third reversing switch alternately connecting the further data bus with the channel data storage connected with the D/A-converter and the channel address storage;
   a channel selector switch operatively connected with the D/A-converter;

said channel selector switch being settable by means of the channel address storage; and said channel selector switch serving for switching the D/A-converter to the individual analog channels.

2. The circuit as defined in claim 1, further including:

galvanic decoupling means provided between the channel data storage and the channel address storage, on the one hand, and the D/A-converter and the channel selector switch on the other hand.

3. The circuit as defined in claim 2, wherein:

said galvanic decoupling means comprises opto-couplers.

4. The circuit as defined in claim 1 or 2, wherein: the number of analog channels amounts to at least 20 and at most 64.

5. The circuit as defined in claim 1, further including:

a filter arranged in circuit after the analog storage of each analog channel; and said filter having an output terminal forming a channel output.

6. The circuit as defined in claim 5, further including:

an inverter connected with the output terminal of analog channel; and said inverter delivering an inverted output signal.

7. The circuit as defined in claim 6, wherein:

said output signals comprise symmetrical output signals possessing a potential of at most ±10 volts.

* * * * *

UNITED STATES PATENT AND TRADEMARK OFFICE
CERTIFICATE OF CORRECTION

PATENT NO. : 4,509,047
DATED : April 2, 1985
INVENTOR(S) : FRITZ RHYNER

It is certified that error appears in the above—identified patent and that said Letters Patent is hereby corrected as shown below:

Column 6, line 3, after "to", delete "a".

Column 7, line 9, after "that the" insert --data is repeatedl again written-in (refreshed) into such--

Column 10, line 9, after "of" insert --each--

Signed and Sealed this

Tenth Day of September 1985

[SEAL]

Attest:

DONALD J. QUIGG

Attesting Officer    Acting Commissioner of Patents and Trademarks - Designate